United States Patent
Noro et al.

(10) Patent No.: US 8,369,542 B2
(45) Date of Patent: Feb. 5, 2013

(54) POWER CONTROL APPARATUS, SPEAKER APPARATUS AND POWER CONTROL METHOD

(75) Inventors: Masao Noro, Hamamatsu (JP); Takanori Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1163 days.

(21) Appl. No.: 12/113,626

(22) Filed: May 1, 2008

(65) Prior Publication Data

US 2008/0279399 A1 Nov. 13, 2008

(30) Foreign Application Priority Data

May 1, 2007 (JP) ................................. 2007-120674

(51) Int. Cl.
*H03F 99/00* (2009.01)
*G05F 1/00* (2006.01)
(52) U.S. Cl. ......................... 381/120; 323/282; 713/300
(58) Field of Classification Search .................. 381/120; 323/282; 713/300
See application file for complete search history.

(56) References Cited

U.S. PATENT DOCUMENTS

| | | | |
|---|---|---|---|
| 5,847,549 A * | 12/1998 | Dodson, III | 323/220 |
| 6,086,430 A * | 7/2000 | Amoni et al. | 439/680 |
| 6,357,011 B2 * | 3/2002 | Gilbert | 713/300 |
| 6,456,051 B2 * | 9/2002 | Darzy | 323/284 |
| 6,665,199 B2 * | 12/2003 | Vanherck | 363/55 |
| 6,665,801 B1 * | 12/2003 | Weiss | 713/300 |
| 6,765,375 B1 * | 7/2004 | Tu et al. | 323/282 |
| 6,782,491 B1 * | 8/2004 | Foedlmeier et al. | 714/37 |
| 7,498,793 B2 * | 3/2009 | Xu | 323/288 |
| 2002/0018351 A1 | 2/2002 | Vanherck | |
| 2005/0052222 A1 | 3/2005 | Ootani et al. | |
| 2005/0162017 A1 * | 7/2005 | Chin et al. | 307/44 |
| 2007/0063681 A1 * | 3/2007 | Liu | 323/282 |
| 2007/0079157 A1 * | 4/2007 | Wang et al. | 713/300 |
| 2007/0192523 A1 * | 8/2007 | May | 710/123 |
| 2008/0008337 A1 * | 1/2008 | Liu | 381/120 |

FOREIGN PATENT DOCUMENTS

| | | |
|---|---|---|
| JP | 2001-202144 A | 7/2001 |
| JP | 2004-503199 A | 1/2004 |
| JP | 2004-104922 A | 4/2004 |
| JP | 2005-86843 A | 3/2005 |

OTHER PUBLICATIONS

Japanese Office Action dated Dec. 24, 2008 with English translation (seven (7) pages).

* cited by examiner

*Primary Examiner* — Steven J Fulk
(74) *Attorney, Agent, or Firm* — Crowell & Moring LLP

(57) ABSTRACT

The speaker apparatus according to the invention is arranged in a manner that when the magnitude of an audio signal Sin increases temporarily and so a consumption power increases, a DC-DC converter reduces an output voltage Vout to thereby increase an output current Iout and further discharges a capacitor to thereby increase a current supplied to an amplifier. Thus, a power of 2.5 W or more supplied from a USB connection terminal can be temporarily supplied to the amplifier. Further, since the change of the voltage difference between the both ends of the capacitor can be made large, an amount of the electric charges discharged from the capacitor can be made large and so the size of the capacitor can be reduced.

6 Claims, 4 Drawing Sheets

POWER CONTROL APPARATUS, SPEAKER APPARATUS AND POWER CONTROL METHOD

BACKGROUND OF THE INVENTION

The present invention relates to a technique of boosting the voltage value of power being supplied and outputting the boosted power.

Terminals accorded to the USB (Universal Serial Bus) standard have been widely spread in personal computers etc. Various kinds of peripheral devices can be coupled via the USB terminal. Since such a USB terminal includes a signal line and a power supply line, the peripheral device coupled to the USB terminal can be supplied with power from the power supply line. The power supply line is restricted in its allowable voltage to be 5 volt or less and in its allowable current to be 500 mA or less due to the standard of the USB terminal, so that the usable power is 2.5 W at the maximum.

However, in some of the peripheral devices to be coupled to the USB terminals, a consumption power instantaneously exceeds 2.5 W at the peak. Thus, as disclosed in JP-T-2004-503199, there has been proposed an apparatus in which a capacitor is provided at an input portion for receiving power from the power supply line of the USB terminal, and a power at the peak time of the peripheral device coupled to the USB terminal is compensated by utilizing power accumulated in the capacitor.

However, since the apparatus disclosed in JP-T-2004-503199 is configured to merely employ the capacitor, there arises a problem that a power capable of being accumulated is small. Further, since it is necessary to greatly increase the capacity of the capacitor in order to increase the accumulated power, the volume of the capacitor becomes quite large. Thus, in a case of a USB amplifier for driving a speaker, since a capacitor of a large capacity is required, the amplifier can not be miniaturized.

SUMMARY OF THE INVENTION

The invention has been made in view of the aforesaid circumstance, and an object of the invention is to provide a power control apparatus, a speaker apparatus and a power control method which can be miniaturized and can drive with a high output power by compensating a power at the peak time even if a power supply having a small maximum value of a supply power is used.

In order to solve the aforesaid problem, the invention provides a power control apparatus, including:

a voltage converter that converts a voltage value of a power supplied from an external power supply into a predetermined voltage value and outputs the predetermined voltage;

a voltage generator that generates a feedback voltage having a voltage value lower than the voltage value of the power supplied from the external power supply based on the voltage value of the power outputted from the voltage converter, wherein the voltage converter controls the predetermined voltage so that the feedback voltage becomes a reference voltage set in advance;

a current detector that detects a current value of the power supplied to the voltage converter; and a voltage correction unit that increases the feedback voltage when the current value detected by the current detector becomes a predetermined current value or more.

In another preferable aspect, the voltage generator includes a first resistor and a second resistor, and divides the voltage value of the power outputted from the voltage converter by using the first and second resistors to generate the feedback voltage.

In another preferable aspect, the voltage correction unit includes a transistor which is turned on when the current value detected by the current detector becomes the predetermined current value or more to increase the feedback voltage by the power supplied from the external power supply.

In another preferable aspect, there is further provided with a capacitor which charges and discharges electric charges, wherein the capacitor discharges the electric charges in accordance with a reduction value of the predetermined voltage when the voltage converter controls to reduce the predetermined voltage.

The invention provides a speaker apparatus including:

the above power control apparatus;

an amplifier which amplifies an input audio signal by using a power supplied from the voltage converter; and a speaker which outputs the audio signal amplified by the amplifier, wherein when the capacitor of the power control apparatus discharges, the amplifier amplifies the input audio signal by further using a power generated by the discharge.

The invention provides a power control method including:

converting a voltage value of a power supplied from an external power supply into a predetermined voltage value and outputting the predetermined voltage;

generating a feedback voltage having a voltage value lower than the voltage value of the power supplied from the external power supply based on the voltage value of the power outputted from the voltage converter;

detecting a current value of the power supplied to the voltage converter;

increasing the feedback voltage when the current value detected by the current detector becomes a predetermined current value or more; and controlling the predetermined voltage so that the feedback voltage becomes a reference voltage set in advance.

According to the invention, it is possible to provide a power control apparatus, a speaker apparatus and a power control method which can be miniaturized and can drive with a high output power by compensating a power at the peak time even if a power supply having a small maximum value of a supply power is used.

DESCRIPTION OF PREFERRED EMBODIMENTS

Hereinafter, an embodiment of the invention will be explained.

<Embodiment>

Figure 1:
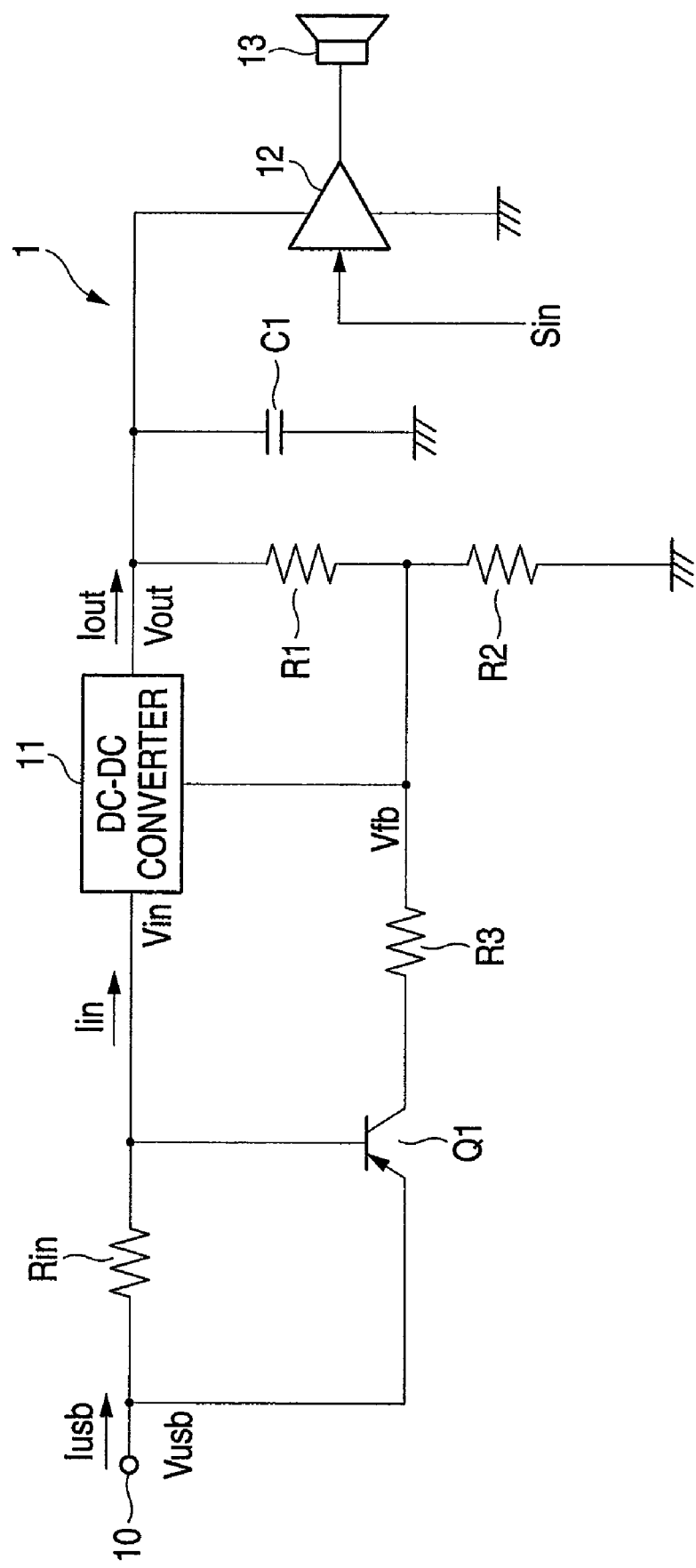
FIG. 1 is a circuit diagram showing the configuration of a speaker apparatus according to an embodiment.

In the embodiment, the explanation will be made as to a speaker apparatus 1 which is coupled to a USB terminal and can be driven with a high output power. First, the configuration of the speaker apparatus 1 will be explained with reference to FIG. 1. FIG. 1 is a circuit diagram showing the configuration of the speaker apparatus 1 according to the embodiment of the invention.

A USB connection terminal 10 is configured to receive electric power when being coupled to a USB connection terminal provided at a personal computer acting as an external power supply. The external power supply is a constant voltage source. The voltage Vusb supplied to the USB connection terminal 10 is 5 volt and the current Iusb supplied thereto is 500 mA at the maximum.

A DC-DC converter 11 is a DC voltage converter which converts an input voltage Vin into an output voltage Vout and outputs the output voltage Vout. The output voltage Vout is adjusted in a manner that a feedback voltage Vfb inputted separately to the converter becomes a reference voltage set in advance. When a transistor Q1 described later is in an off state, the feedback voltage Vfb is a voltage value which is obtained by dividing the output voltage Vout by resistors R1 and R2.

In this embodiment, the DC voltage converter is arranged in a manner that when the reference voltage is set to 1 volt and the output voltage Vout is controlled so as to set the feedback voltage Vfb to 1 volt, the output voltage Vout becomes 10 volt. For example, in the case where the feedback voltage Vfb becomes larger than 10 volt, the DC-DC converter 11 recognizes that the output voltage Vout increases and hence controls the output voltage Vout to reduce its value. On the other hand, when the feedback voltage Vfb becomes smaller than 1 volt, the DC-DC converter 11 recognizes that the output voltage Vout reduces and hence controls the output voltage Vout to increase its value. The reference voltage is set to a voltage smaller than the voltage Vusb inputted from the USB connection terminal 10.

The values of the resistors R1 and R2 are set in a manner that the feedback voltage Vfb becomes 1 volt when the output voltage Vout is 10 volt, so that the a ratio of resistance values between the resistors R1 and R2 is set to 9:1 (in this embodiment, the resistor R1 is 9kΩ and the resistor R2 is 1kΩ). Since the values of these resistors are set to be quite large as compared with a value of the internal resistor of an amplifier 12 described later, currents flowing through the resistors R1 and R2 are considered to be quite small values. Thus, in the following description, since such quite small currents can be neglected, the explanation is made that all the output current Iout from the DC-DC converter 11 flows into the amplifier 12 and a capacitor C1 etc.

The DC-DC converter 11 is supposed to have a conversion efficiency of 80%. That is, 80% of the input power to the converter is outputted from the converter. For example, when the input power is 2.5 W (5 volt, 500 mA), the output power becomes 2.0 W (10 volt, 200 mA).

The amplifier 12 is an amplifying circuit which is supplied with electric power from the DC-DC converter 11 and amplifies an audio signal Sin inputted thereto to thereby output sound from a speaker 13. In this embodiment, the speaker 13 has an impedance Zsp of 8Ω.

Figure 2:
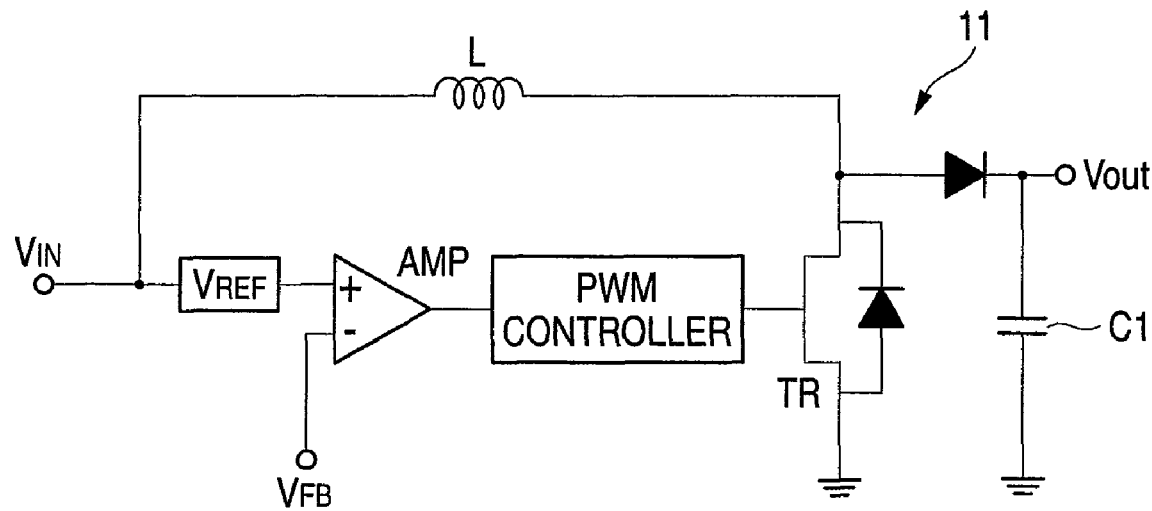
FIG. 2 is a circuit diagram of a DC/DC converter.

FIG. 2 shows an example of the DC-DC converter. A voltage Vin supplied from the resistance Rin is input to one end of a comparator AMP through a reference voltage generator Vref. The feedback voltage Vfb is supplied to the other end of the comparator AMP. The reference voltage output from the reference voltage generator Vref is compared with the feedback voltage Vfb, and the resultant is supplied to a PWM controller. The PWM controller output a PWM (Pulse Width Modulation) control signal in response to a output value of the comparator. The PWM control signal output from the PWM controller drives and switches a transistor TR and the transistor TR outputs the drive signal to a post stage through a diode. A capacitor C1 connects an output of the diode and a ground, so that the output of the diode is smoothed. The capacitor C1 shown in FIG. 1 can function as the capacitor C1 in FIG. 2.

A resistor Rin is provided between the USB connection terminal 10 and the DC-DC converter 11 and supplies a voltage having been dropped by the resistor Rin to the base of the transistor Q1. The resistance value of the resistor Rin is set to 1Ω in this embodiment so that the voltage of 4.5 volt is applied to the base of the transistor Q1 when the input current Iusb reaches the upper limit 500 ma.

The transistor Q1 is a PNP transistor which changes from an off state where a current flows scarcely therethrough to an on state where the conduction is made between the emitter and the collector there of when a voltage difference VBE between the emitter and the collector exceeds 0.5 volt (in the case where the input current Iusb is 500 mA). The emitter is coupled to the USB connection terminal 10 and supplied with 5 volt.

The sum of a resistance value of a resistor R3 and a resistance value between the emitter and the collector in the on state of the transistor Q1 is set to be same as the resistance value of the resistor R1, that is, 9Ω. Since the resistance values are set in this manner, when the transistor Q1 becomes the on state, the feedback voltage Vfb increases due to the influence of the voltage Vusb of the USB connection terminal 10. However, since the DC-DC converter 11 controls and reduces the output voltage Vout to 6 volt, the feedback voltage Vfb can be reduced to the reference voltage of 1 volt. Even before the voltage difference VBE of the transistor Q1 reaches 0.5 volt (before the input current Iusb reaches 500 mA,), since the resistance value between the emitter and the collector of the transistor Q1 starts to reduce, the feedback voltage Vfb starts to increase, so that the DC-DC converter 11 controls so as to reduce the output voltage Vout.

In this manner, when the input current Iusb approaches 500 mA, the output voltage Vout of the DC-DC converter 11 reduces. Since the output voltage Vout reduces, the output current Xout can be increased so long as the output power is the same. For example, even if the upper limit of the output current Iout is 200 mA when the output voltage. Vout is 10 volt, the upper limit of the output current Iout can be increased to 333 mA when the output voltage Vout becomes 6 volt.

The sum of the resistance value of the resistor R3 and the resistance value between the emitter and the collector in the on state of the transistor Q1 is set to be quite large as compared with the resistance value of the resistor Rin and the internal resistance value of the DC-DC converter 11 etc. Thus, of the current Iusb inputted from the USB connection terminal 10, a current flowing into the transistor Q1 is considered to be a quite small. Thus, in the following description, the explanation will be made that such the quite small current is negligible and the input current Iin inputted into the DC-DC converter 11 is same as the current Iusb inputted from the USB connection terminal 10.

The capacitor C1 is provided between the DC-DC converter 11 and the amplifier 12 and has a capacitance of 10,000 μF. This capacitor accumulates electric charges according to the output voltage Vout from the DC-DC converter 11. When the output voltage Vout reduces, the capacitor discharges the accumulated electric charges to thereby increase the current supplied to the amplifier 12. For example, when the output voltage Vout reduces from 10 volt to 6 volt, the capacitor can discharge the accumulated electric charges of 10,000 μF·(10 volt−6 volt)=40 mC. Thus, the C1 can supply the current generated in accordance with the discharge time period of the electric charges, that is, 400 mA to the amplifier if the electric charges are discharged for about 0.1 second, for example.

Next, the explanation will be made as to the speaker apparatus 1 coupled to the personal computer. The audio signal Sin is inputted to the amplifier 12. The audio signal Sin is supposed to be a signal representing a music. In general, the audio signal representing such as a music has a large difference between a peak output and an average output thereof. Although such a difference varies depending on the types and kinds of music, it is generally said that the average output is almost in a range from ⅛ to ¹/₁₀ of the peak output. Thus, if the power at the peak time is compensated temporarily, the amplifier 12 can be driven during a time period other than the peak time period with the power in a range from ⅛ to ¹/₁₀ of the peak output.

First, the explanation will be made as to the case where the magnitude of the audio signal Sin is in a state other than the peak value. Since the impedance Zsp of the speaker 13 is 8Ω, when the DC-DC converter 11 outputs the output current Iout of 150 mA, the speaker delivers the output of 0.18 W in accordance with the audio signal Sin. In this case, the capacitor C1 accumulates the electric charges of 100 mC. This state is maintained while the magnitude of the audio signal Sin is low and the current Iusb does not reach 500 mA.

Next, the explanation will be made as to the case where the magnitude of the audio signal Sin increases and changes to the peak value. When the magnitude of the audio signal Sin increases and the output current Iout also increases to about 180 mA and so the output of the speaker becomes about 0.26 W, the current Iusb becomes almost 500 mA. The reason why the output current Iout increases merely to about 180 mA at the output voltage Vout of 10 volt despite that the current Iusb reaches 500 mA is that the power of about 0.25 W is consumed due to the voltage drop of about 0.5 volt at the resistor Rin and so the maximum power outputted from the DC-DC converter 11 becomes (2.5 W−0.25 W)·80%=1.8 W.

When the current Iusb reaches about 500 mA, since the feedback voltage Vfb increases, the DC-DC converter 11 controls so as to reduce the output voltage Vout. Thus, as described above, the output voltage Vout reduces by 4 volt at the maximum and so becomes 6 volt. In this case, the maximum value of the output current Iout from the DC-DC converter 11 becomes 300 mA, and so the output of 0.72 W at the maximum can be obtained. On the other hand, the capacitor C1 discharges the electric charges of 40 mC since the output voltage Vout reduces by 4 volt. Thus, as described above, for example, the current of 400 mA, can further be supplied to the amplifier 12 during 0.1 second. In this manner, since the current of about 700 mA can be supplied to the amplifier 12 during the time period of 0.1 second where the capacitor C1 discharges, the output of about 3.92 W can be obtained. As a result, the power equal to or larger than the power supplied from the USB connection terminal 10, that is, the power of 2.5 W or more can be temporarily outputted.

Thereafter, when the magnitude of the audio signal Sin reduces and the current Iusb reduces, the transistor Q1 is turned off, so that the feedback voltage Vfb reduces to thereby control the output voltage Vout of the DC-DC converter 11 so as to increase and so the output voltage Vout restores to 10 volt. Thus, the capacitor C1 again charges the electric charges of 100 mC.

In this manner, in the speaker apparatus 1 according to the invention, the capacitor C1 is charged by the output voltage Vout boosted by the DC-DC converter 11 when the magnitude of the audio signal Sin is small and the consumption power is small. When the magnitude of the audio signal Sin increases temporarily and the consumption power increases, the DC-DC converter 11 reduces the output voltage Vout to increase the output current Iout and discharges the capacitor C1 to increase the supply current to the amplifier 12. Thus, the power equal to or larger than the power supplied from the USB connection terminal 10, that is, the power of 2.5 W or more can be temporarily supplied to the amplifier 12. Further, since the DC-DC converter 11 changes the output voltage Vout in accordance with the consumption power, the changing amount of the voltage difference between the both ends of the capacitor C1 can be made larger as compared with the case where the output voltage is not changed, so that the discharge amount of the electric charges of the capacitor C1 can be made large. Thus, since the capacitance value of the capacitor C1 can be made small, the size of the capacitor C1 can be made small and so the speaker apparatus 1 can be miniaturized.

Although the explanation is made as to the embodiment of the invention, the invention can be implemented in various modes as explained below.

FIRST MODIFIED EXAMPLE

Figure 3:
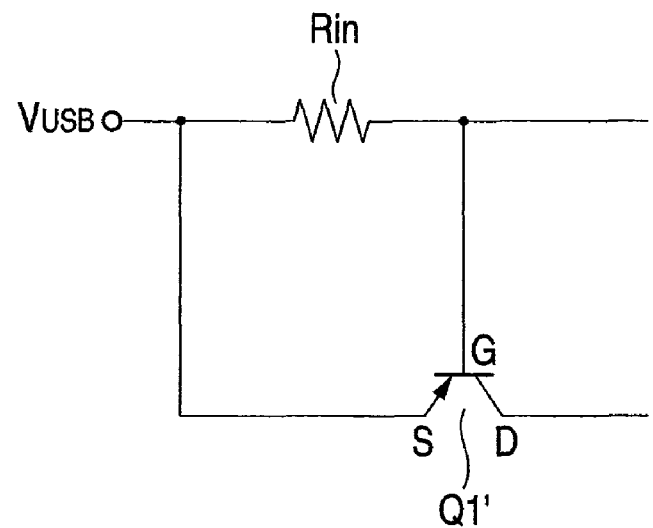
FIG. 3 is a modified example of a transistor Q1.

Although in the embodiment, the transistor Q1 is the PNP transistor, the transistor may be a P-channel FET (Field Effect Transistor) Q1' shown in FIG. 3. In this case, the line coupled to the base of the PNP transistor may be coupled to the gate of the P-channel FET Q1' and the line coupled to the emitter/collector of the PNP transistor may be coupled to the source/drain of the P-channel FET Q1'. In this case, the effects similar to those of the embodiment can also be obtained.

SECOND MODIFIED EXAMPLE

Although in the embodiment, the sum of the resistance value of the resistor R3 and the resistance value between the emitter. and the collector in the on state of the transistor Q1 is set to be the predetermined resistance value, the resistor R3 may not be necessarily employed. In this case, the resistance value between the emitter and the collector in the on state of the transistor Q1 may be set to be the predetermined resistance value by adjusting the size of the transistor Q1. According to such a modification, the effects similar to those of the embodiment can also be obtained without using the resistor R3.

THIRD MODIFIED EXAMPLE

In the embodiment, the sum of the resistance value of the resistor R3 and the resistance value between the emitter and the collector in the on state of the transistor Q1 is set to be the resistance value of the resistor R1. Thus, when the transistor Q1 maintains the on state, that is, when the current Iusb maintains the value of about 500 mA, the output voltage Vout of the DC-DC converter 11 reduces to 6 volt so that the feedback voltage Vfb becomes the reference voltage of 1 volt. In this respect, the sum of the resistance value of the resistor R3 and the resistance value between the emitter and the collector in the on state of the transistor Q1 may be adjusted depending on the voltage to which the output voltage Vout is reduced. In other words, the sum of the resistance values may be adjusted so that the feedback voltage Vfb becomes 1 volt when the output voltage Vout becomes the lower limit voltage.

FOURTH MODIFIED EXAMPLE

Figure 4:
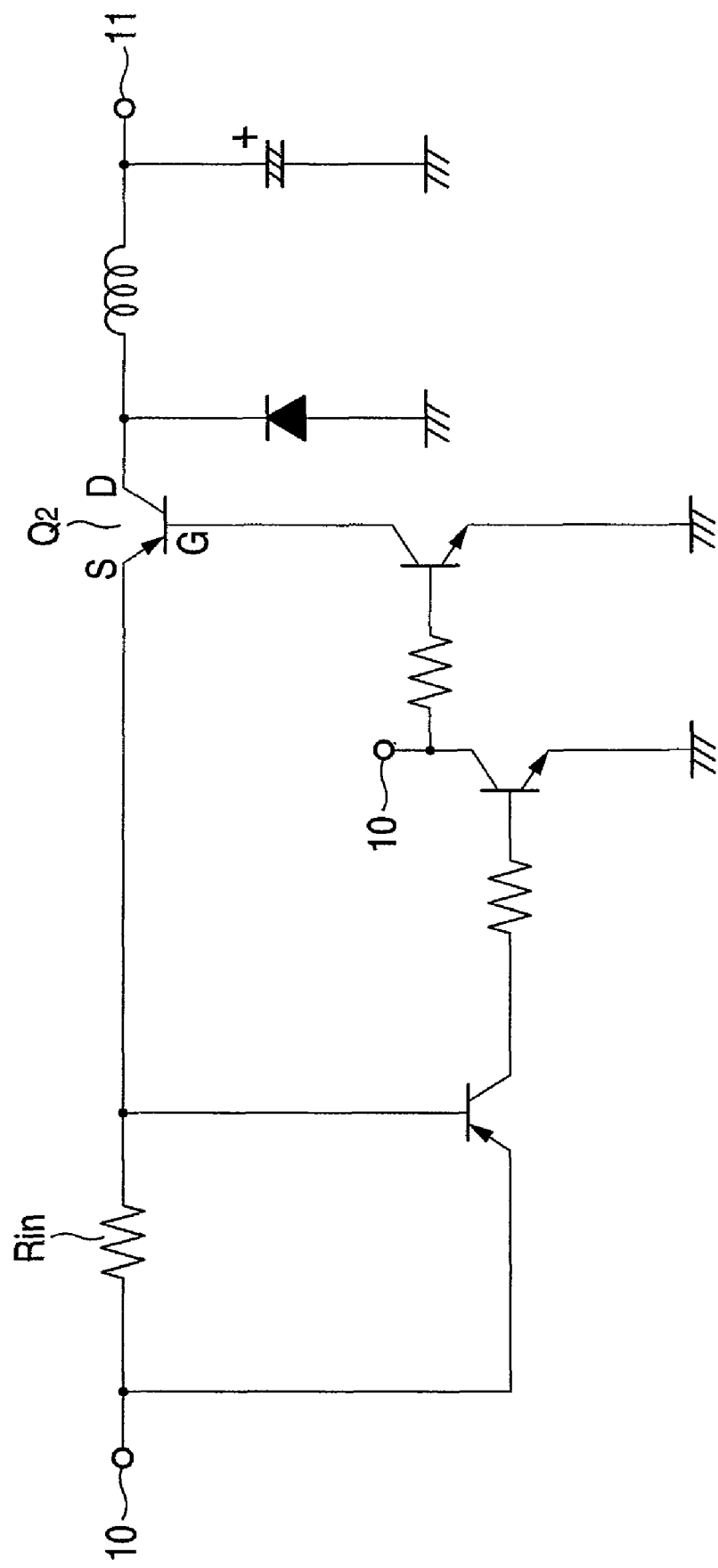
FIG. 4 is a circuit diagram of a limiter.

A limiter may be provided between the USB connection terminal 10 and the DC-DC converter 11 in the embodiment so as not to flow the current of 500 mA or more. FIG. 4 shows the example of the limiter. In this example, the current is detected by a resistor Rin, and when the detected current exceeds 500 mA, a transistor Q1 starts switching operation to decrease the voltage of the DC-DC converter 11. According to such a configuration, a current of 500 mA or more does not flow any more in the power supply for supplying the power to the USB connection terminal of the personal computer which is coupled to the USB connection terminal 10, and hence a load of the power supply can be reduced.

FIFTH MODIFIED EXAMPLE

In the embodiment, although the output voltage Vout of the DC-DC converter 11 is set to be 10 volt when the transistor Q1 is in the off state, the voltage is not limited to 10 volt. In this case, there may be provided with an operation portion which can set the output voltage in accordance with the operation of a user. Alternatively, at least one of the resistors R1 and R2 may be set to be a variable resistor which resistance value can be changed by a user in a manner that the output voltage Vout can be changed by adjusting a ratio of the resistance values between the resistors R1 and R2. For example, when the ratio of the resistance values between the resistors R1 and R2 is set to be 7:1, the output voltage Vout becomes 8 volt in order to set the feedback voltage Vfb to 1 volt.

In this respect, when the output voltage Vout is set to be more than 10 volt, although the power capable of being outputted becomes small in the normal state where the output voltage is 10 volt or more, the electric charges Qc capable of being discharged from the capacitor C1 at the time of peak power becomes large. Thus, the power capable of being outputted at the peak can be increased. In contrast, when the output voltage Vout is set to be more than 10 volt, although the power capable of being outputted at the time of peak power becomes small, the power capable of being outputted in the normal state becomes large. Thus, the optimum output voltage Vout can be set depending on the output characteristics of the audio signal Sin to be inputted, that is, depending on the magnitude of the change of the value of the signal. There may be provided with an output characteristics acquisition means for obtaining in advance the output characteristics of the audio signal Sin to be inputted in a manner that the output characteristics acquisition means automatically controls the DC-DC converter 11 or the resistance value ratio between the resistors R1 and R2 in accordance with the obtained output characteristics to thereby determine the output voltage Vout.

Figure 5:
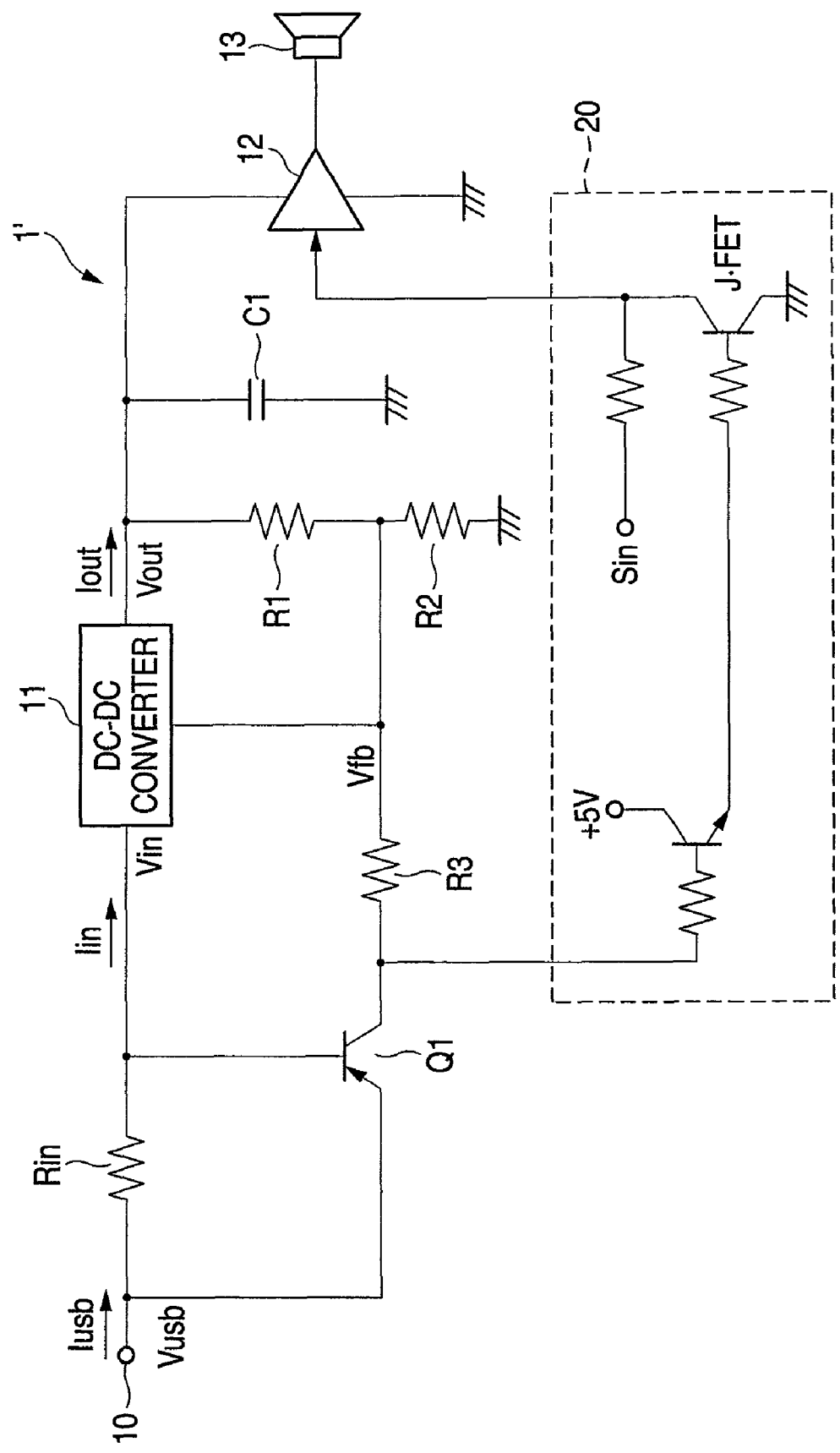
FIG. 5 is an example of output characteristics acquisition means.

FIG. 5 shows an example of the output characteristics acquisition means 20 which controls the DC-DC converter 11.

What is claimed is:

1. A power control apparatus, comprising:
a voltage converter that converts a voltage value of a power supplied from an external power supply into a predetermined voltage value and outputs the predetermined voltage;
a voltage generator that generates a feedback voltage having a voltage value lower than the voltage value of the power supplied from the external power supply based on the voltage value of the power outputted from the voltage converter wherein the voltage converter controls the predetermined voltage so that the feedback voltage becomes a reference voltage set in advance;
a current detector that detects a current value of the power supplied to the voltage converter; and
a voltage correction unit that causes the voltage generator to generate the feedback voltage based on the voltage value of the power supplied from the external power supply and the voltage value of the power outputted from the voltage converter when the current value detected by the current detector becomes a predetermined current value or more, to thereby increase the voltage value of the feedback voltage.

2. The power control apparatus according to claim 1, wherein the voltage generator includes a first resistor and a second resistor, and divides the voltage value of the power outputted from the voltage converter by using the first and second resistors to generate the feedback voltage.

3. The power control apparatus according to claim 1, wherein the voltage correction unit includes a transistor which is turned on when the current value detected by the current detector becomes the predetermined current value or more to increase the feedback voltage by the power supplied from the external power supply.

4. The power control apparatus according to claim 1 further comprising a capacitor which charges and discharges electric charges,
wherein the capacitor discharges the electric charges in accordance with a reduction value of the predetermined voltage when the voltage converter controls to reduce the predetermined voltage.

5. A speaker apparatus comprising:
the power control apparatus according to claim 4;
an amplifier which amplifies an input audio signal by using a power supplied from the voltage converter; and
a speaker which outputs the audio signal amplified by the amplifier,
wherein when the capacitor of the power control apparatus discharges, the amplifier amplifies the input audio signal by further using a power generated by the discharge.

6. A power control method comprising:
converting a voltage value of a power supplied from an external power supply into a predetermined voltage value and outputting the predetermined voltage;
generating a feedback voltage having a voltage value lower than the voltage value of the power supplied from the external power supply based on the voltage value of the power outputted from the voltage converter;
detecting a current value of the power supplied to the voltage converter;
causing the feedback voltage to be generated based on the voltage value of the power supplied from the external power supply and the voltage value of the power outputted from the voltage converter when the current value detected by the current detector becomes a predetermined current value or more, thereby increasing the feedback voltage; and
controlling the predetermined voltage so that the feedback voltage becomes a reference voltage set in advance.

* * * * *